United States Patent [19]

Takada et al.

[11] Patent Number: 4,864,193
[45] Date of Patent: Sep. 5, 1989

[54] LUMINOUS ELEMENT AND DRIVING CIRCUIT

[75] Inventors: Hisashi Takada; Mitsuaki Nishie, both of Kanagawa, Japan

[73] Assignee: Sumitomo Electric Industries, Ltd., Osaka, Japan

[21] Appl. No.: 129,905

[22] Filed: Dec. 7, 1987

Related U.S. Application Data

[63] Continuation of Ser. No. 795,446, Nov. 6, 1985, abandoned.

[30] Foreign Application Priority Data

Nov. 7, 1984 [JP] Japan ................. 59-234644
Nov. 7, 1984 [JP] Japan ................. 59-234645

[51] Int. Cl.$^4$ ............................................. G09F 9/00
[52] U.S. Cl. ............................................. 315/71; 340/762
[58] Field of Search .................. 315/71, 169.3, 244, 315/307; 340/762, 813; 357/17, 19

[56] References Cited

U.S. PATENT DOCUMENTS 4,068,148  1/1978  Nomiya et al. ..................... 315/307
4,190,836  2/1980  Kimura et al. ..................... 340/762

FOREIGN PATENT DOCUMENTS 58-56271 12/1983 Japan .

Primary Examiner—Robert L. Griffin
Assistant Examiner—T. Salindong
Attorney, Agent, or Firm—Cushman, Darby & Cushman

[57] ABSTRACT

A luminous element and driving circuit in which an additional circuit is connected in parallel with the luminous element which in turn is serially connected with a suitable transistor. The additional circuit includes an element for minimizing distortion of the luminous output. In one embodiment, a field effect transistor with its gate and source connected together is serially connected with a coil to quickly discharge the luminous element when the transistor is turned off and charge the element quickly when the transistor is turned on. In a second embodiment, a semiconductor diode is serially connected to the coil to form the additional circuit. The voltage across the light emitting diode when the transistor is turned off causes the luminous element to be immediately luminous.

6 Claims, 4 Drawing Sheets

PRIOR ART

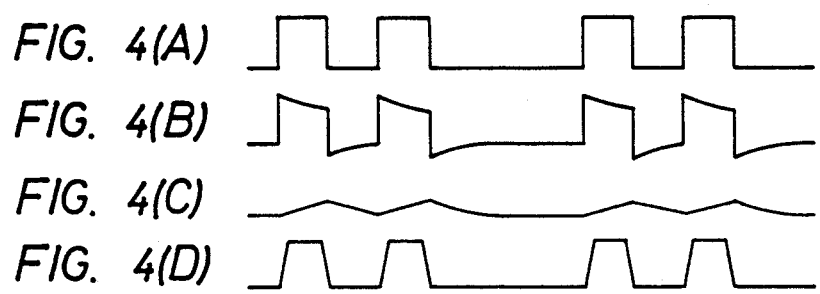
FIG. 4(A)
FIG. 4(B)
FIG. 4(C)
FIG. 4(D)
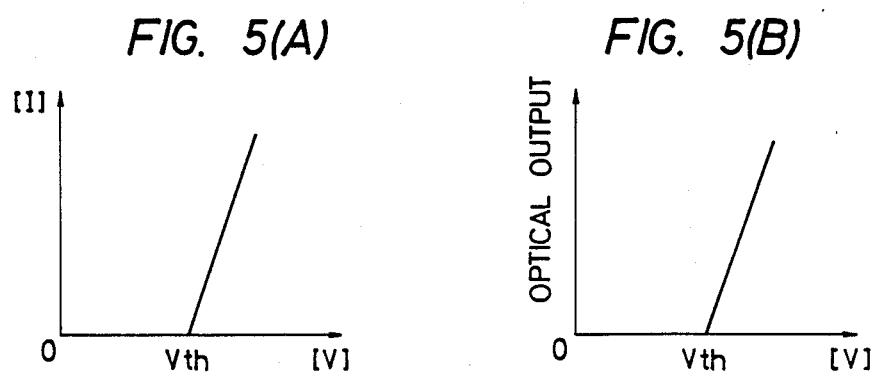
FIG. 5(A)
FIG. 5(B)

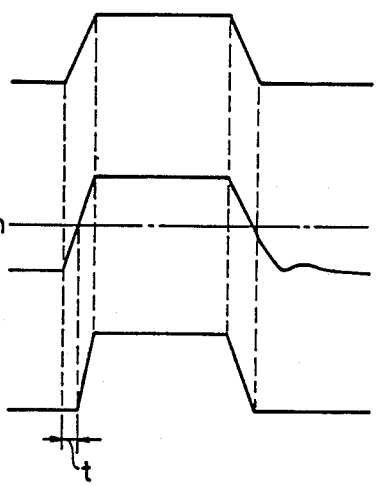
FIG. 6(A)
FIG. 6(B) Vth
FIG. 6(C)
t
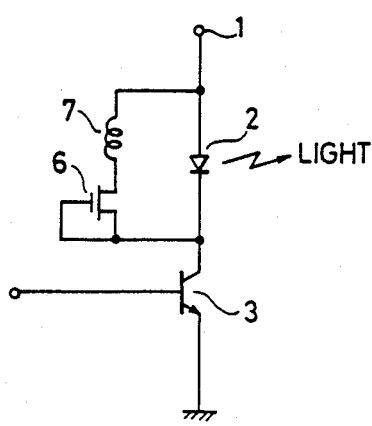
FIG. 7
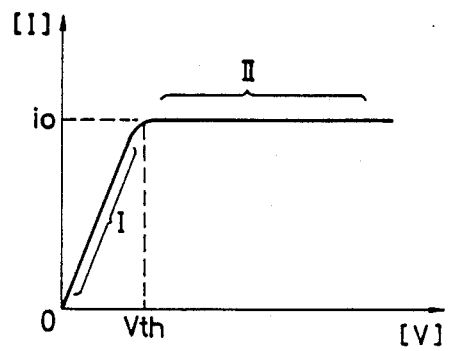
FIG. 8

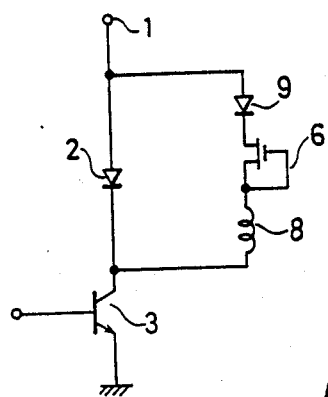
FIG. 9
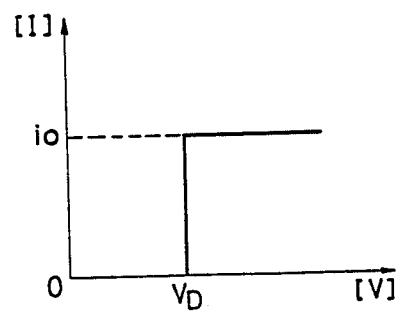
FIG. 10
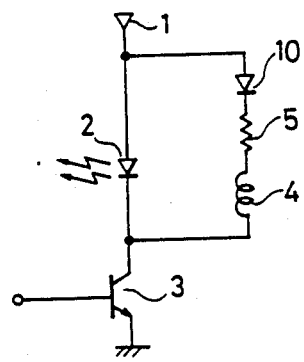
FIG. 11
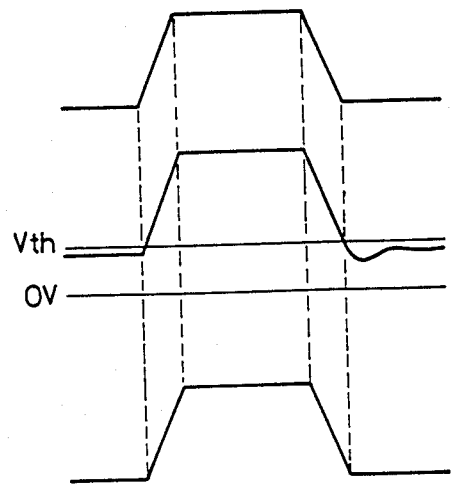
FIG. 12(A)
FIG. 12(B)
FIG. 12(C)

LUMINOUS ELEMENT AND DRIVING CIRCUIT

This is a continuation of application Ser. No. 795,446, filed Nov. 6, 1985, which was abandoned upon the filing hereof.

The present invention relates to a luminous element and driving circuit for driving a luminous element for use in optical communication.

Semiconductor lasers or light emitting diodes are widely in use as luminous elements (luminous sources) in optical communication by pulse code modulation (PCM). However, the distortion produced in a luminous waveform as the driving frequency becomes higher tends to make the waveform unable to follow the driving current waveform.

FIG. 1 illustrates the geometry of a conventional luminous element driving circuit. A positive power supply terminal 1 is connected to the anode of a light emitting diode 2. The collector of an npn transistor 3 is connected to the cathode of light emitting diode 2 and the emitter thereof is grounded. The transistor 3 drives the light emitting diode 2 by signals received by the base thereof.

FIG. 2 shows waveforms associated with the luminous element driving circuit of FIG. 1, and FIG. 2(A) shows the waveform of the signal applied to the base of the transistor 3. When the signal of FIG. 2(A) is applied to the base of the transistor 3, the transistor 3 operates as a current supply switch, whereby a fixed driving current flows from the positive power supply terminal 1 into the light emitting diode 2 as shown in FIG. 2(B). The light emitting diode 2 produces a luminous output as shown in FIG. 2(C) from the driving current. Since a light emitting diode is a capacitive load, the optical output waveform becomes an integral waveform of the driving current waveform. As the inpedance of the transistor 3 increases, particularly when the transistor 3 is turned off, the delay of the optical output becomes conspicuous.

FIG. 3 shows one prior art proposal for solving the aforementioned problems. The circuit comprises the series combination of a coil 4 and a resistor 5 connected in parallel to the light emitting diode 2 of FIG. 1. The additional circuit causes the waveform of the current flowing through the light emitting diode 2 to peak as shown in FIG. 4(B) when the waveform of the current flowing through the transistor 3 of FIG. 3 rises and decays. The optical output waveform of the light emitting diode 2 shown in FIG. 4(D) is improved so that the light emitting diode 2 may be operated at high speed. In that case, the current shown in FIG. 4(C) flows through the additional circuit.

The circuit configuration shown in FIG. 3 improves the response speed of the light emitting diode 2 as shown in FIG. 4(D). The optical output is particularly improved because the release of the charge stored in the parasitic capacitance of the light emitting diode 2 is ensured by the connection of the additional circuit to the circuit configuration.

However, further problems are newly posed in that the connection of the additional circuit makes the voltage across the light emitting diode always close to zero volt when the light is off. In other words, almost no current flows when the voltage across the light emitting diode is lower than the threshold voltage $V_{th}$ as shown by the voltage—current characteristics of the luminous semiconductor element such as a light emitting diode or semiconductor laser of FIG. 5(A). As shown in FIG. 5(B), accordingly, there is caused delay in luminescence because the luminous element emits almost no light until its terminal voltage reaches the threshold voltage $V_{th}$ from zero. FIG. 6 illustrates how the delay occurs at the time of luminescence; namely, FIGS. 6(A) and 6(B) respectively show the current flowing through the light emitting diode 2 and the luminous diode 2 terminal voltage waveform. A luminous output as shown in FIG. 6(C) is produced when the rising voltage reaches the threshold voltage $V_{th}$. Thus there is a delay in time t until the threshold voltage $V_{th}$ is reached during the build up of luminescence.

SUMMARY OF THE INVENTION

An object of the present invention is to provide a luminous element driving circuit capable of not only minimizing the distortion of the optical output waveform of a luminous element formed with a semiconductor laser or light emitting diode but also reducing power consumption.

More particularly, an object is to avoid delay between switching on and producing luminescence.

In order to solve the aforementioned problems according to the present invention, an additional circuit including a coil, and a further circuit element minimizing distortion are provided in parallel with the luminous element.

In one embodiment the further element is a field effect transistor. In a second embodiment, the further element is a semiconductor diode. In a third embodiment a field effect transistor and diode are serially connected to the coil to form the additional circuit.

Use is made of the voltage-current characteristics of a field effect transistor with the gate and source connected mutually wherein a fixed low resistance is exhibited when the voltage is low and of the non-linear characteristics thereof providing a high resistance as the current is limited to a fixed amount when the voltage is high. In other words, the low resistance and coil inductance while the optical output of the luminous element is trailing are used to release the charge quickly from the parasitic capacitance of the luminous element. On the other hand, the driving current flowing through the field effect transistor is limited to the aforesaid amount to restrict current consumption while the optical output of the luminous element is maintained in a high state.

In the second and third embodiments the luminous element terminal voltage is offset by the threshold voltage of the semiconductor diode at the time of the extinction by the semiconductor diode. The characteristics of the luminous element at the time of luminescence are such that the voltage is made to start rising from the threshold voltage by selecting the threshold voltage of the semiconductor diode roughly at the same level of that of the luminous element. Delay in the build up of luminescence is thus avoided.

BRIEF DESCRIPTION OF THE DRAWINGS

FIGS. 4(A), 4(B), 4(C) and 4(D) show waveforms produced by the prior art circuit of FIG. 3.

FIGS. 5(A) and 5(B) respectively show current versus voltage characteristics and optical output versus voltage of the prior art circuit of FIG. 3.

FIGS. 6(A), 6(B) and 6(C) show the input and output waveforms for the prior art circuit of FIG. 3.

FIG. 7 shows a first embodiment of the present invention.

FIG. 8 shows the current versus voltage characteristics of a field effect transistor with the source and gate connected together.

FIG. 9 shows another embodiment of the present invention.

FIG. 10 shows the current versus voltage characteristics of the circuit of FIG. 9.

FIG. 11 shows yet another embodiment of the present invention.

FIG. 12 shows the waveforms produced by the embodiment of FIG. 11.

DETAILED DESCRIPTION OF THE INVENTION

Figure 1:
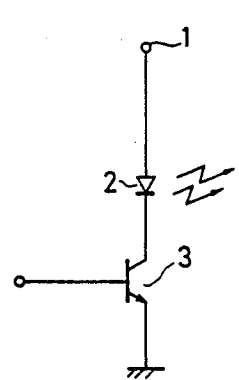
FIG. 1 shows a luminous element and driving circuit according to the prior art.
Figure 3:
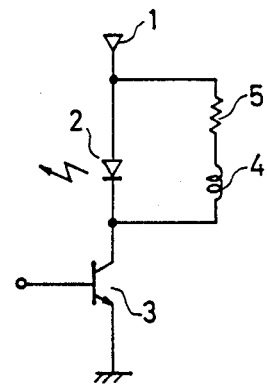
FIG. 3 shows a second prior art luminous element and driving circuit.
Figure 2A:
FIGS. 2(A), 2(B) and 2(C) show waveforms produced by the prior art circuit of FIG. 1.
Figure 2B:
Figure 2C:

Referring to FIG. 7, a first embodiment of the present invention will be described. FIG. 7 shows a luminous element and driving circuit embodying the present invention with like elements of the circuit shown in FIG. 1 given like reference numerals and the description thereof omitted. In FIG. 7, the gate and source of a field effect transistor 6 are mutually connected, and the drain is connected to a coil 7 in series to form an additional circuit. One end of the additional circuit, i.e., the open end of the coil 7 is connected to the anode of light emitting diode 2 and positive power supply terminal 1. The other end of the additional circuit, i.e., the gate and source of the field effect transistor 6, is connected to the cathode of the light emitting diode 2 and the collector of a transistor 3.

FIG. 8 shows the voltage-current characteristics of two-terminal field effect transistor 6 whose gate and source are mutually connected. In FIG. 8, an almost fixed resistance (normally approximately 10 ohms) results in the region I in response to the voltage applied across the drain and source of the field effect transistor 6, whereas a high resistance (about 10 K ohms) results in the region II wherein the current becomes roughly constant.

While the optical output of the light emitting diode 2 is decaying as the transistor 3 is switched over to the off state, a low voltage lower than the threshold voltage Vth is applied across the source and drain of the field effect transistor 6, so that the low resistance in region I of FIG. 8 is present. The charge is thus quickly released and excellent decay characteristics are obtained. Moreover, while the optical output of the light emitting diode 2 is rising as the transistor 3 is switched over to the on state, the region II becomes applicable wherein the current is limited to $i_o$. The resistance across the additional circuit is thus controllable and, because the time required to charge the light emitting diode 2 with parasitic capacitance can be shortened, the leading characteristics are improved. The optical output waveform is thus improved, provided tht the inductance L of the coil 7 is so selected as to make the time constant L/R relative to the resistance R of the field effect transistor 6 in the region I equal to the time constant relative to the optical output waveform.

FIG. 9 shows another embodiment embodying the present invention, wherein the source and gate of a field effect transistor 6 are connected to one end of a coil 8, and the drain of the field effect transistor 6 is connected to the cathode of a semiconductor diode 9 to form an additional circuit. Unlike the additional circuit previously described, in this additional circuit the anode of a light emitting diode 2, a positive power supply terminal 1 and the anode of the semiconductor diode 9 are connected, whereas the cathode of the light emitting diode 2, the collector of a transistor 3 and one end of coil 8 are connected together.

FIG. 10 shows the voltage-current characteristics of the additional circuit of FIG. 9, wherein a charge parasitic to the capacitance of the light emitting diode 2 is discharged through the additional circuit when the transistor 3 is switched over to the off state. The terminal voltage of the light emitting diode 2 is then offset by the voltage VD of the semiconductor diode 9 and held thereat. The threshold voltage VD of the semiconductor diode 9 is selected to be roughly equal to the threshold voltage of the light emitting diode 2. When the transistor 3 is switched over to the on state, the light emitting diode 2 is charged with voltage equivalent to the threshold voltage VD from the beginning. Thus, the light emitting diode 2 changes immediately into a luminescent state.

Accordingly, the time required to charge the light emitting diode with the threshold voltage, i.e., the period of time during which no luminous output is present in the light emitting diode 2, is reduced and a satisfactory leading edge obtained. The current flowing through the additional circuit is limited to a fixed value while the transistor 3 is held on because of the operation of the field effect transistor 6.

Although the light emitting diode was used as a luminous element in the above-described embodiments, a semiconductor laser may also be usable. The relationship between the current for driving the light emitting diode and the luminous output is such that, while the luminous output increases in proportion to the current, the luminous output sharply rises in the case of a semiconductor laser if it is charged with voltage exceeding the threshold voltage. For that reason, although delay in decay time is minimized in the case of a semiconductor laser as compared with the light emitting diode, basically the same effect as in the case of the luminous diode is obtained from the semiconductor laser applied to the present invention, so that higher speed operation becomes possible.

Reference is now made to FIG. 11 which shows a circuit configuration embodying a further embodiment of the present invention, wherein a coil 4, a resistor 5 and the cathode of a diode 10 are serially connected to form an additional circuit. One end of the additional circuit, i.e. the anode of diode 10 is connected to the anode of a light emitting diode 2 and a positive power supply terminal 1, whereas the other end of the additional circuit, i.e. one end of the coil 4 is connected to the cathode of the light emitting diode 2 and the collector of a transistor 3.

Although the charge stored in the capacitance parasitic to the light emitting diode 2 is discharged through the additional circuit when the transistor 3 is turned off at the time of extinction, the light emitting diode terminal voltage is not reduced to zero at the time of extinction because of the working of the diode 10 and is offset by the threshold voltage VD of the diode 10. Thus, the delay at the time of build up of luminescence by the light emitting diode 12 is avoided, provided that the threshold voltage VD of the diode 6 is selected so as to make to roughly equal to the threshold voltage of the light emitting diode 2. In other words, a voltage across the light emitting diode 2 is generated as shown in FIG. 12(B) when the driving current flows through the light emitting diode 2 as shown in FIG. 12(A) and its voltage starts rising at roughly the threshold voltage Vth. As shown in FIG. 12(C), accordingly, the luminous output appears in the light emitting diode 2 simultanously with the start of the driving current.

Given dynamic resistance RD when the diode 10 operates and a time constant of D at the time of decay of the light emitting diode 2, preferred decay characteristics will be obtained, provided that the respective values L and R of the coil 4 and the resistor 5 are so selected as to satisfy the following relation:

$$D = L/(R+RD)$$

As a concrete example, an ordinary high-frequency pn junction diode as the diode 10 with L=100 nanohenry and R=30 ohms was used for a light emitting diode in the wavelength region of 1.3 micron with build up time=2.6 nanoseconds and decay time=4.6 nanoseconds. Then both build up and decay times were found to be 2.3 nanoseconds. In addition, there was no delay in the rise of the pulse waveform and preferable 200 megabit/sec driving was found possible.

The present invention is intended to minimize the distortion of the optical output waveform within the luminous element, shorten the rise and decay time and make high-speed operation possible. Moreover, the present invention is designed to make possible the limitation of current consumption to a fixed value or lower while the luminous element is driven and thereby reduce in power consumption. Accordingly, the present invention is particularly fit for application to PCM optical communications.

We claim:

1. A luminous element and driving circuit comprising:
   a luminous element adapted to be connected to a voltage source;
   electronic switching means serially connected to said luminous element for causing current flow through said luminous element and an optical output signal to be formed in response to an input signal; and
   additional circuit means for reducing distortion of said optical output signal by maintaining the luminous element near its threshold voltage for illumination by releasing charge due to its capacitance very quickly, thereby shortening a rise and a decay time of said optical output signal in response to switching on of said switching means, said additional circuit means being connected in parallel with said luminous element and including a coil and, in series with said coil, at least one of a field effect transistor with the gate and source thereof connected together and a semiconductor diode having an anode connected to an anode of said luminous element.

2. An element and driving circuit as in claim 1 wherein the drain and source of said field effect transistor are serially connected with said coil.

3. An element and driving circuit as in claim 2 wherein a time constant L/R of said additional circuit means is equal to a time constant relative to the optical output signal where L is the inductance of the coil and R is the resistance of the field effect transistor.

4. An element and driving circuit as in claim 1 wherein a threshold voltage of said semiconductor diode is roughly equal to a threshold voltage of said luminous element.

5. An element and driving circuit as in claim 1 wherein luminous element is a light emitting diode.

6. An element as in claim 1 wherein switching means is a transistor.

* * * * *